(12) United States Patent
Bhalerao et al.

(10) Patent No.: US 10,866,787 B2
(45) Date of Patent: Dec. 15, 2020

(54) PLUGGABLE FRAMEWORK

(71) Applicant: American Express Travel Related Services Company, Inc., New York, NY (US)

(72) Inventors: Pravin T. Bhalerao, Weston, FL (US); Michael A. Calleiro, Fort Lauderdale, FL (US); Baranidharan Chinnasamy, Weston, FL (US); Manjunath B. Devadi, Weston, FL (US); Chandler C. Helmuth, Phoenix, AZ (US); Gabriel A. Jimenez, Miami Lakes, FL (US); Vijayakumar Sitha Mohan, Weston, FL (US); Celia Suzanne Nelson, Coral Springs, FL (US); Diego Romero, Coral Gables, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 69 days.

(21) Appl. No.: 16/229,892

(22) Filed: Dec. 21, 2018

(65) Prior Publication Data
US 2020/0201607 A1    Jun. 25, 2020

(51) Int. Cl.
*G06F 9/44* (2018.01)
*G06F 8/30* (2018.01)
*G06F 8/61* (2018.01)

(52) U.S. Cl.
CPC .............. *G06F 8/315* (2013.01); *G06F 8/61* (2013.01)

(58) Field of Classification Search
CPC .................................. G06F 8/315; G06F 8/61
USPC .................. 717/101–103, 114–118, 162–167
See application file for complete search history.

(56) References Cited

U.S. PATENT DOCUMENTS

| | | | | |
|---|---|---|---|---|
| 2004/0142683 | A1* | 7/2004 | Clark | H04L 67/303 455/418 |
| 2008/0092149 | A1* | 4/2008 | Rowbotham | G06F 9/451 719/321 |
| 2012/0159145 | A1* | 6/2012 | Cheong | G06F 9/44526 713/100 |
| 2014/0223425 | A1* | 8/2014 | Brown | G06F 8/65 717/173 |

(Continued)

OTHER PUBLICATIONS

Vogella GmbH, "OSGi Modularity—Tutorial", May 2018, retrieved from https://web.archive.org/web/20180516162751/http://www.vogella.com/license.html, 23 pages (Year: 2018).*

(Continued)

*Primary Examiner* — Ted T. Vo
(74) *Attorney, Agent, or Firm* — Thomas Horstemeyer, LLP

(57) ABSTRACT

A system includes modularized generic framework applications that are built to be deployable across any Java based application, with the ability to maintain multiple runtime versions. Pluggable framework applications may be self-contained units of APIs and implementations. The pluggable framework applications may be written in Java. The pluggable framework applications may be independently scalable, deployable, changeable and/or replaceable modules. The pluggable framework applications may be modular, scalable, and have high availability, as well as allow for hot deployment, standardization, easy integration, and/or code reuse.

18 Claims, 4 Drawing Sheets

(56) References Cited

U.S. PATENT DOCUMENTS

| | | | |
|---|---|---|---|
| 2014/0280767 A1* | 9/2014 | Bridges | H04L 67/02 709/219 |
| 2015/0244585 A1* | 8/2015 | Birk | H04L 63/10 726/23 |
| 2016/0226663 A1* | 8/2016 | Jones | H04L 9/14 |
| 2018/0131514 A1* | 5/2018 | Jones | G06F 21/121 |

OTHER PUBLICATIONS

Splunk SDK, "IService Interface", 2014, Splunk Inc., 3 pages. (Year: 2014).*

* cited by examiner

PLUGGABLE FRAMEWORK

FIELD

The present disclosure relates to computer systems, and more specifically, to development of software applications.

BACKGROUND

Development and deployment of software applications is a time-consuming process. It is also difficult or impossible to run multiple versions of the same application using the same configurations and structure. Moreover, development and deployment are typically geared toward a specific application server. The typical monolithic procedures provide no easy failover, impacting high availability. Additionally, developers are often required to write code that is mainly duplicative of existing code used in other programs. Therefore, a need exists for improving the development and deployment of software applications.

SUMMARY

Systems and methods are disclosed that create modularized generic framework APIs that are built to be deployable across any JAVA®-based application, with the ability to maintain multiple runtime versions. The system may perform operations including loading a configuration file, wherein the configuration file comprises initial setup instructions for a pluggable framework; deploying the pluggable framework based on the configuration file; and loading a pluggable framework application into a classloader provided by the deployed pluggable framework, wherein the pluggable framework application comprises an IService interface configured to allow the pluggable framework application to be compatible with the pluggable framework.

In various embodiments, the configuration file comprises metadata of the pluggable framework application to be loaded during deployment of the pluggable framework. The configuration file may define a preloaded application to be loaded during deployment of the pluggable framework, wherein the preloaded application comprises at least one of a security manager, an exception manager, or a framework class. The preloaded application may be usable by the pluggable framework application. The system operation of loading the pluggable framework application may comprise receiving the pluggable framework application from an admin user interface (UI) of the pluggable framework after deployment of the pluggable framework. The system may also perform operations including receiving a data consumption request from a data consumer, wherein the data consumption request comprises a specified pluggable framework application; invoking the pluggable framework based on the data consumption request; and granting access to the classloader containing the pluggable framework application corresponding to the specified pluggable framework application, wherein in response to being granted access the data consumer interacts with the pluggable framework application to access the data provider. The classloader may comprise a CustomBundle classloader or an OSGIBundle classloader.

In various embodiments, the system may perform operations including loading a framework API; loading, using a first classloader, a first version of a first business service API, wherein the first version of the first business service API runs in conjunction with the framework API; and loading, using a second classloader, a second version of the first business service API, wherein the second version of the first business service API runs in conjunction with the framework API.

In various embodiments, the first version of the first business service API and the second version of the first business service API have an identical name. The system may also include loading, using a third classloader, a first version of a second business service API, wherein the first version of the second business service API runs in conjunction with the framework API. The system may load, using a fourth classloader, a second version of the second business service API, wherein the second version of the second business service API runs in conjunction with the framework API, wherein the first version of the second business service API and the second version of the second business service API have an identical name. The framework API may be a caching API or a logging API. The framework API may be deployable across any Java based application. The first classloader and the second classloader may be independent classloaders.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
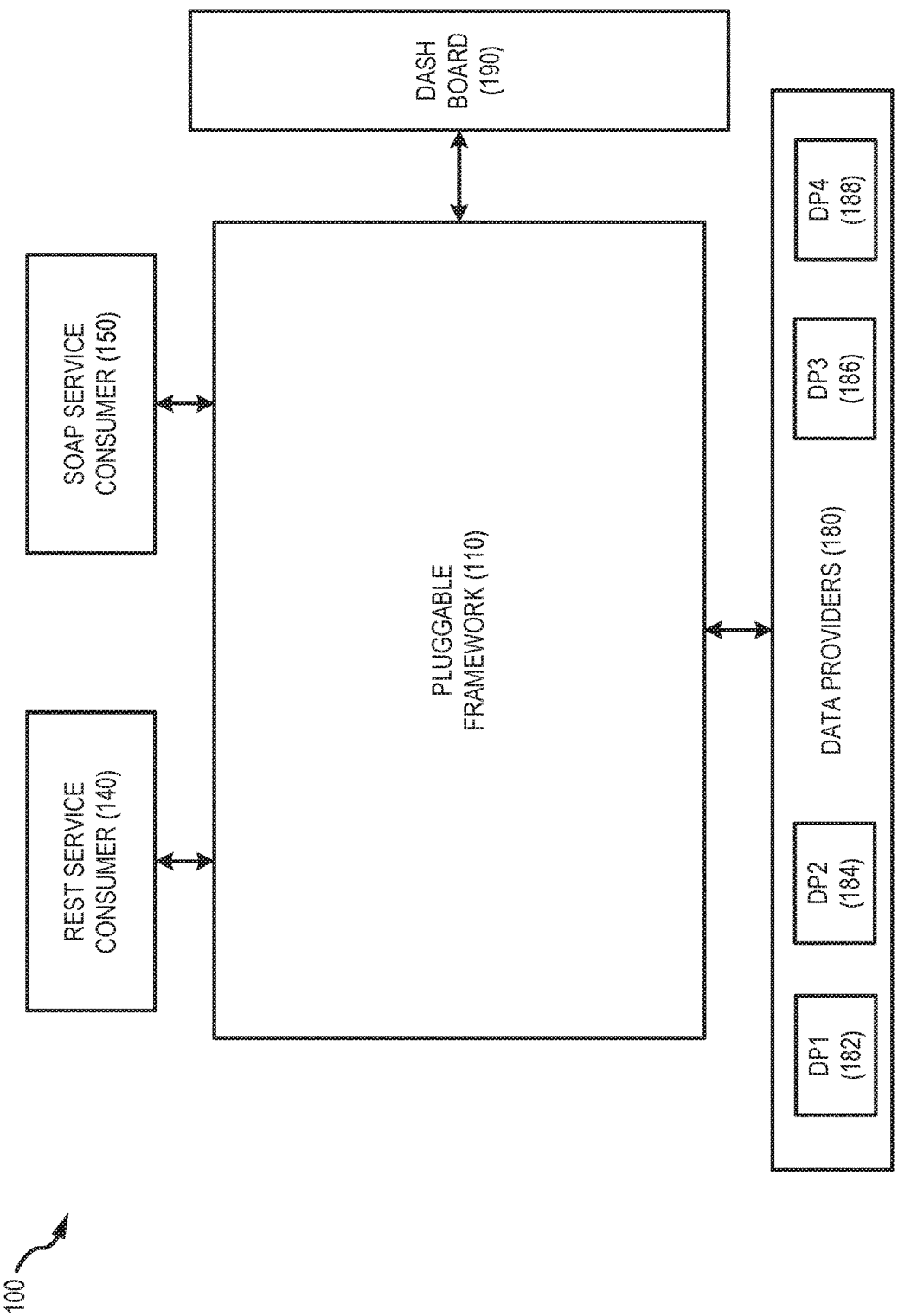
FIG. 1 illustrates an architecture diagram of a system for pluggable framework applications, in accordance with various embodiments.

Systems and methods are disclosed herein that create modularized generic framework applications that are built to be deployable across any JAVA®-based application or environment, with the ability to maintain multiple runtime versions. Although discussed herein primarily in accordance with JAVA®-based applications, environments, and systems, in accordance with various embodiments the systems and methods may also be used in MICROSOFT® .NET-based systems, applications, or environments, and/or in any other suitable system, environment, or application wherein deployment of modularized generic framework applications is desired. Pluggable framework applications are software modules. The pluggable framework application may be self-contained units of applications and implementations. The pluggable framework application may be written in JAVA®. The pluggable framework application may include independently scalable, deployable, changeable and/or replaceable modules. The pluggable framework application may be modular, scalable, and/or have high availability, as well as allow for hot deployment of new or versioned applications, coding standardization, easy integration, and/or code reuse.

In various embodiments, each pluggable framework application may run through a separate class loader. The JAVA® Class Loader is a part of the JAVA® Runtime Environment that dynamically loads Java classes into the JAVA® Virtual Machine (JVM). Classes are usually only loaded on demand. The JAVA® runtime system does not need to know about files and file systems because of class loaders. The class loader is responsible for locating libraries, reading their contents, and loading the classes contained within the libraries. The JVM may by default come with a bootstrap class loader, an extensions class loader, and/or a system class loader.

Additionally, in various embodiments, the system may utilize independent class loaders. The independent class loaders may load up each functionality for an application. Thus, the system may utilize multiple versions of the same pluggable framework application, class, or the like. For example, a class may relate to promises to pay on an account. The system may store a first version of the class with the name "promisetopay.class". The system may store a second version with the class, which is different than the first version, but with the identical name "promisetopay.class". However, each version may be loaded by a different class loader.

Various standardized pluggable framework applications, such as for logging, exception handling, etc., may be utilized. Thus, new pluggable framework applications may focus on the functionality which is unique to the new application, without having to recode logging, exception handling, and other common functionalities. Additionally, if a new pluggable framework application wanted to use a functionality which is not standard, but has been created as a pluggable framework application (e.g., the aforementioned "promisetopay.class"), the new application may utilize that class without having to recode the functionality.

In various embodiments, the pluggable framework applications may also allow for hot deployment. Thus, the system may switch multiple versions of a pluggable framework application at one time with basic class loading, as discussed further herein.

Referring to FIG. 1, an architecture diagram of a system 100 for pluggable framework applications is illustrated according to various embodiments. As discussed herein, a "pluggable framework application" may comprise any suitable software deployable into a pluggable framework, such as, for example, an application programming interface (API), a software development kit (SDK), a software application, a web service, a software module, a software bundle, a software package, and/or the like. A software bundle may comprise a tightly coupled, dynamically loadable collection of classes, jars, and configuration files. The software bundle may expressly declare its external dependencies, including what JAVA® packages it needs, and in what version. In various embodiments, the various phrases and terms used to describe the "pluggable framework application" may be used interchangeably. System 100 may comprise one or more pluggable frameworks 110, REST service consumers 140, SOAP service consumers 150, data providers 180, and/or dashboards 190.

End users may interact with the data providers 180 by submitting requests via the REST service consumer 140 and/or the SOAP service consumer 150. A Representation State Transfer (REST) is a key design idiom that embraces a stateless client-server architecture in which the web services are viewed as resources and can be identified by their URLs. Web service clients that want to use these resources access a particular representation by transferring application content using a small globally defined set of remote methods that describe the action to be performed on the resource. REST is an analytical description of the existing web architecture, and thus the interplay between the style and the underlying HTTP protocol appears seamless. Simple Object Access Protocol (SOAP) provides the envelope for sending web service messages over the Internet. A SOAP envelope may comprise a header providing information on authentication, encoding of data, or how a recipient of a SOAP message should process the message; as well as the body the contains the message.

The data providers 180 may include various databases, such as DP1 182, DP2 184, DP3 186, DP4 188. The data providers 180 may store data which end users, systems, applications, or the like may like to access or interact with. For example, an end user may submit a request via REST service consumer 140 or SOAP service consumer 150, and pluggable framework 110 may execute an associated pluggable framework application to fetch the data from the appropriate data provider 180, as discussed further herein.

The dashboard 190 may accept log messages, do indexes using log messages, provide metrics using log messages, etc. In various embodiments, the dashboard 190 may be a dashboard recording server, server performance dashboard, or the like, such as those provided by SPLUNK®.

In various embodiments, the pluggable framework 110 may comprise a software framework deployed in a computing environment, such as, for example, one or more computer-based systems, servers, processors, articles of manufacture, JAVA® virtual machines (JVMs). The pluggable framework 110 may be configured to allow users to deploy pluggable framework applications, access and interact with various deployed pluggable framework applications, and the like, as discussed further herein.

Figure 2:
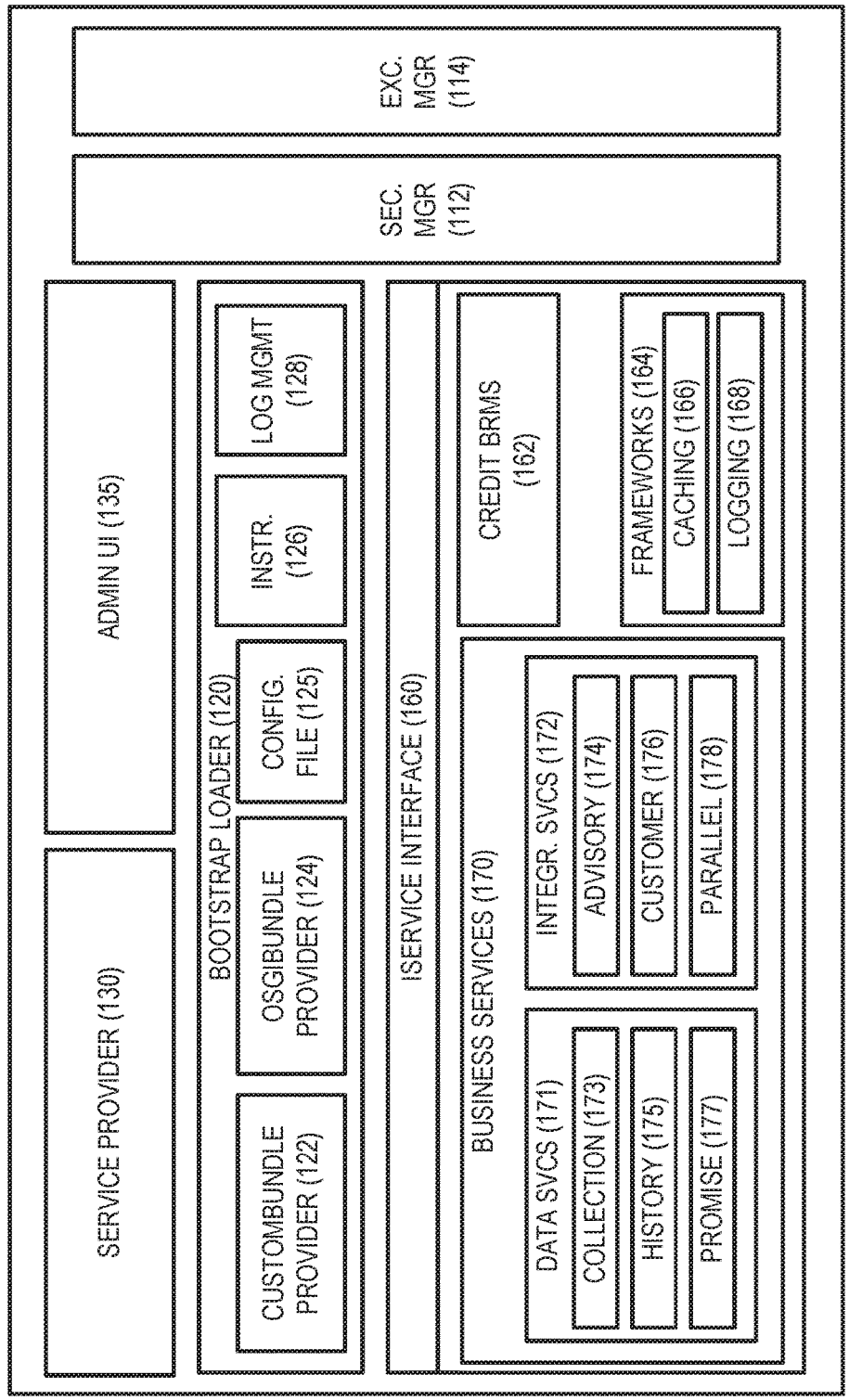
FIG. 2 illustrates an exemplary pluggable framework for the system for pluggable framework applications, in accordance with various embodiments.

Referring to FIG. 2, an exemplary pluggable framework 110 is depicted in greater detail. The pluggable framework 110 may comprise a service provider 130. The service provider 130 may be configured to be invoked by a data or service consumer, such as, for example, REST service consumer 140 and/or SOAP service consumer 150. In response to being invoked by the consumer, service provider 130 may communicate with bootstrap loader 120 to load the requested pluggable framework applications, as discussed further herein. The service provider 130 may comprise any suitable service layer, service provider, or the like, such as, for example, APACHE® Camel CXFRS/WS Services. The Camel CXF component is an APACHE® CXF component that integrates web services with routes. When using CXF as a consumer, the CXF bean component may factor out how message payloads are received from their processing as a RESTful or SOAP web service. This has the potential of using a multitude of transports to consume web services.

The bootstrap loader 120 may initiate loading the system class loader. The bootstrap loader 120 may take care of loading all the code needed to support the basic JAVA® Runtime Environment (JRE). The bootstrap loader 120 may be configured to load pluggable framework applications in the pluggable framework 110 and store and maintain metadata and data regarding available pluggable framework applications in the pluggable framework 110. For example, and in accordance with various embodiments, the bootstrap loader 120 may be configured to read and execute a configuration file 125 to deploy various pluggable framework applications in the pluggable framework 110, as discussed further herein. The configuration file 125 may be configured to provide parameters and initial settings for deploying the pluggable framework 110. The configuration file 125 may also comprise metadata of pluggable framework applications configured to be loaded during deployment of the pluggable framework 110. The metadata of the one or more pluggable framework applications may be stored and triggered based on an application ID, context path, or the like.

As a further example, and in accordance with various embodiments, the bootstrap loader 120 may be configured to deploy one or more pluggable framework applications in response to communications from service provider 130, as discussed further herein. In that regard, the bootstrap loader 120 may comprise one or more classloaders configured to deploy the pluggable framework applications, such as, for example, a CustomBundle provider module 122, and an OSGIBundle provider module 124.

The CustomBundle provider module 122 may use Java's internal bootstrap class loader to load the pluggable framework application. This allows the pluggable framework 110 to load new pluggable framework applications or update pluggable framework applications that are currently installed. The CustomBundle provider module 122 may allow multiple pluggable framework applications with the same classes to be loaded to the classpath. The OSGIBundle provider module 124 may provide the same (or similar) functionalities and benefits as the CustomBundle provider module 122, but allow the loading of a pluggable framework application for an OSGI type jar. For example, the OSGIBundle provider module 124 may ensure the creation of at least one jar for OSGI pluggable framework applications, and may be configured to recognize internally dependent pluggable framework applications. In that regard, the pluggable framework 110, via the bootstrap loader 120, may be able to recognize the specific type of application being loaded, and enable the loading and importing of different types of pluggable framework applications into the pluggable framework 110.

The CustomBundle provider module 122 and/or the OSGIBundle provider module 124 may be instantiated in response to bootstrap loader 120 being loaded. For example, a bootstrap classloader may initiate the classloading process and start all the classloaders in the application. In various embodiments, the pluggable framework 110 ensures that each pluggable framework application is running on its own classloader.

In various embodiments, the bootstrap loader 120 may further comprise an instrumentation module 126 (e.g., instr. 126) and a log management module 128 (e.g., log mgmt 128). The instrumentation module 126 may be configured to maintain metadata regarding the current state of the various pluggable framework applications deployed in the pluggable framework 110. For example, the current state may comprise active, inactive, or the like. The instrumentation module 126 may be configured to change the current state of a pluggable framework application in response to receiving instructions from admin UI 135, as discussed further herein. In various embodiments, instrumentation module 126 may also be configured to maintain a version history of one or more pluggable framework applications, including a current state for each version. The log management module 128 may be configured to communicate with logging class 168 in framework classes 164. For example, the log management module 128 may communicate with logging class 168 to log details events in the pluggable framework 110, such as deploying pluggable framework applications, invoking pluggable framework applications, and the like.

In various embodiments, the pluggable framework 110 may comprise an admin UI 135. The admin UI 135 may be configured to enable users to perform various administrative tasks and operations. For example, users may access the admin UI 135 to review pluggable framework applications deployed in the pluggable framework 110, perform actions on pluggable framework applications deployed in the pluggable framework 110, deploy new pluggable framework applications in pluggable framework 110, and/or the like, as discussed further herein. For example, a user may perform actions on deployed applications by changing the status of the application, such as by making the application inactive or active, stopping the application (e.g., the application is still installed but not running), restarting the application, uninstalling the application, updating the application, or the like. In that regard, accessing the admin UI 135 may allow the user to upload new versions of an application. As a further example, a user may deploy new applications in pluggable framework 110 by uploading an executable file via the admin UI 135, by inputting a file path, or the like.

In various embodiments, access to the admin UI 135 may be controlled using any suitable security control, such as, for example, through the use of an administrative user name and password, biometric input, or the like. The admin UI 135 may be accessible via any suitable computing device, internet-enabled device, or the like, such as, for example a desktop computer, a laptop, a tablet, a handheld computer, a smartphone (e.g., IPHONE®, BLACKBERRY®, and/or the like), an internet of things (IoT) device, and/or the like. For example, the admin UI 135 may comprise a graphical user interface (GUI), web page or interface, or the like, and may be accessible via a web browser (e.g., MICROSOFT INTERNET EXPLORER®, GOOGLE CHROME®, etc.), an application, a micro-app or mobile application, or the like.

In various embodiments, the configuration file 125 may comprise one or more preloaded applications, admin applications, or the like. In that regard, in response to the pluggable framework 110 being deployed, the preloaded applications may be loaded into pluggable framework 110. For example, the pluggable framework 110 may comprise a security manager 112 (e.g., sec. mgr 112), an exception manager 114 (e.g., exc. mgr 114), one or more framework classes 164 (e.g., frameworks 164), and/or the like.

The security manager 112 may be an object that defines a security policy for pluggable framework applications deployed using the pluggable framework 110. For example, the security policy may specify actions that are unsafe or sensitive. Any action not allowed by the security policy may cause a security exception to be thrown. A deployed pluggable framework application may also query its security manager 112 to discover which actions are allowed. The exception manager 114 may allow the pluggable framework 110 to smoothly handle unexpected conditions that occur as pluggable framework applications run. For example, in response to a security exception, unexpected condition, or the like occurring, exception manager 114 may throw an exception to signal the security exception or unexpected condition encountered.

The framework classes 164 may comprise one or more preloaded classes, admin classes, or the like, such as, for example a caching class 166 (e.g., caching 166), a logging class 168 (e.g., logging 168), and the like. The caching class 166 may store classes. Once a class is loaded, it may be retained as long as the classloader that loaded it exists. The logging class 168 may manage both the configuration of the log system and the objects that do the actual logging. For example, the logging class 168 may be in communication with the log management module 128, and may be configured to perform various logging operations based on instructions from the log management module 128. The security manager 112, the exception manager 114, and the various framework classes 164 may be modularized and generic, such that they may be deployable across any JAVA®-based application, with the ability to maintain multiple runtime versions. Some examples of generic framework classes and APIs may include service-provider API, bundle-provider API, region-router API, db2-gateway API, ims-gateway API, geo-account API, exception API, cryptography API, etc.

The pluggable framework 110 may comprise an IService interface 160. The IService interface 160 may comprise a class, JAVA® interface, template, or the like, enabling different types of pluggable framework applications to be compatible with the pluggable framework 110. In that respect, the IService interface 160 may comprise a predefined structure that software developers must implement into any pluggable framework application to be deployed in the pluggable framework 110. For example, the predefined structure may contain the various business rules, coding requirements and structure, and the like for application operations. By integrating the predefined structure, pluggable framework applications may be installed in the pluggable framework 110 at the time the pluggable framework 110 is deployed (e.g., by specifying the pluggable framework applications in the configuration file 125), or as a "hot deployment" post-deployment of the pluggable framework 110 (e.g., by uploading the pluggable framework application, selecting the file path of the pluggable framework application, or the like in the admin UI 135).

In various embodiments, the pluggable framework 110 allows developers to create business service classes 170. The business service classes 170 may include data services 171 (e.g., data svcs 171) and integration services 172 (e.g., integr. svcs 172). Developers may create and deploy into the pluggable framework 110 any desired number of data services 171, such as, for example, CollectionService 173 (e.g., collection 173), HistoryService 175 (e.g., history 175), PromiseService 177 (e.g., promise 177), etc. Developers may create and deploy into the pluggable framework 110 any desired number integration services 172, such as AdvisoryService 174 (e.g., advisory 174), CustomerService 176 (e.g., customer 176), ParallelService 178 (e.g., parrallel 178), etc. As previously discussed herein, the developers may implement the IService interface 160 into each deployed business service 170 and create and integrate logic around the IService interface 160.

In various embodiments, the pluggable framework 110 may further comprise a credit business rule management system (BRMS) 162. The BRMS 162 may be software used to define, deploy, execute, monitor, and maintain the variety and complexity of decision logic that is used by the business service class 170. The decision logic may include policies, requirements, and conditional statements that are used to determine the tactical actions that take place in applications and systems. The BRMS 162 may include a repository, which allows decision logic to be externalized from core application code. The BRMS 162 may include tools, allowing both technical developers and business experts to define and manage decision logic. The BRMS 162 may include a runtime environment, allowing applications to invoke decision logic managed within the BRMS 162 and execute it using business rules engines.

Figure 3:
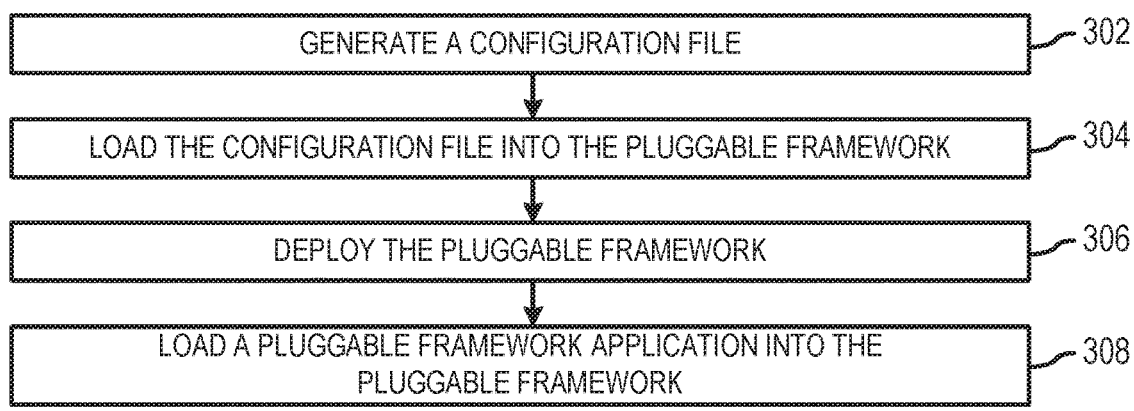
FIG. 3 illustrates an exemplary process for deploying a pluggable framework, in accordance with various embodiments.
Figure 4:
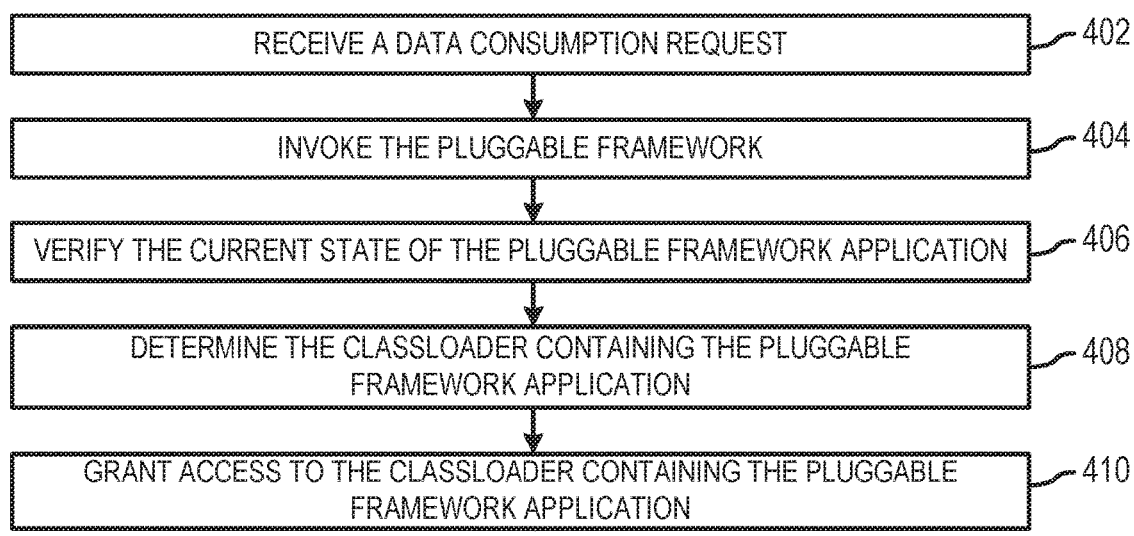
FIG. 4 illustrates an exemplary process for utilizing pluggable framework applications, in accordance with various embodiments.

Referring now to FIGS. 3 and 4 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 3 and 4, but also to the various system components as described above with reference to FIGS. 1 and 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With reference to FIG. 3, a process 301 for deploying a pluggable framework 110 in a computing environment is disclosed. The process 301 may be implemented using one or more computer-based systems, servers, processors, articles of manufacture, JAVA® virtual machines (JVMs), and/or the like. The process 301 may include generating a configuration file 125 (step 302). The configuration file 125 may be configured to provide parameters and initial settings for deploying the pluggable framework 110. The configuration file 125 may also comprise metadata of pluggable framework applications configured to be loaded during deployment of the pluggable framework 110. The metadata may be associated with admin (or preloaded) applications, such as, for example, security manager 112 (e.g., sec. mgr 112), an exception manager 114 (e.g., exc. mgr 114), and/or one or more framework classes 164. In various embodiments, the metadata may also be associated with one or more user-generated pluggable framework applications to be loaded at deployment of the pluggable framework 110 (e.g., data services 171, integration services 172, etc.). The process 301 may include loading the configuration file 125 into the pluggable framework 110 (step 304). For example, a link, file path, or the like associated with the configuration file 125 may be included with or input into the pluggable framework 110 prior to deploying the pluggable framework 110.

The process 301 may include deploying the pluggable framework 110 (step 306) in the computing environment. The pluggable framework may be deployed into any suitable computing environment, such as, for example, into one or more computer-based systems, servers, processors, articles of manufacture, JAVA® virtual machines (JVMs), and/or the like.

The process 301 may include loading a pluggable framework application into the pluggable framework 110 (step 308). The pluggable framework 110, via the bootstrap loader 120, may load the pluggable framework application into CustomBundle provider module 122 or OSGIBundle provider module 124, based on the environment the pluggable framework 110 is deployed into. In various embodiments, in response to the configuration file 125 comprising one or more pluggable framework applications, pluggable framework 110 may load each defined pluggable framework application in response to being deployed. In various embodiments, the pluggable framework 110 may also load one or more pluggable framework applications in response to receiving input from the admin UI 135. For example, a user may access admin UI 135 and upload an executable file, specify a file path, and/or the like. In response to receiving the input, the pluggable framework 110, via the bootstrap loader 120, may load the pluggable framework application into CustomBundle provider module 122 or OSGIBundle provider module 124, based on the environment the pluggable framework 110 is deployed into.

As an example, and in various embodiments, the step 308 may include loading a first version of a first business service 170 (e.g., data services 171, integration services 172, etc.) using a first classloader (e.g., CustomBundle provider module 122, OSGIBundle provider module 124, etc.). The first version of the first business service 170 may run in conjunction with the framework classes 164. The first version of the first business service 170 may be loaded using the configuration file 125 or the admin UI 135, as previously discussed.

In various embodiments, the step 308 may include loading a second version of the first business service 170 using a second classloader (e.g., CustomBundle provider module 122, OSGIBundle provider module 124, etc.). The second version of the first business service 170 may run in conjunction with the framework classes 164. The second version of the first business service 170 may be loaded using the configuration file 125 or the admin UI 135, as previously discussed. In various embodiments, the first version of the first business service 170 and the second version of the first business service 170 may have an identical name, but a different function. However, because the different versions are loaded using different classloaders, the versions may be swapped without creating an exception. Additionally, both the first version of the first business service 170 and the second version of the first business service 170 may use the same framework classes 164. In various embodiments, any number of versions of the first business service 170 may be loaded, each being loaded by its own classloader.

As a further example, and in accordance with various embodiments, the step 308 may include loading a first version of a second business service 170 using a third classloader (e.g., CustomBundle provider module 122, OSGIBundle provider module 124, etc.). The second business service 170 may be customized for a specific application. The first version of the second business service 170 may run in conjunction with the framework classes 164. The first version of the second business service 170 may be loaded using the configuration file 125 or the admin UI 135, as previously discussed.

In various embodiments, the step 308 may include loading a second version of the second business service 170 using a fourth classloader (e.g., CustomBundle provider module 122, OSGIBundle provider module 124, etc.). The second version of the second business service 170 may run in conjunction with the framework classes 164. The second version of the second business service 170 may be loaded using the configuration file 125 or the admin UI 135, as previously discussed. In various embodiments, the first version of the second business service 170 and the second version of the second business service 170 may have an identical name, but a different function. However, because the different versions are loaded using different classloaders, the versions may be swapped without creating an exception. Additionally, both the first version of the second business service 170 and the second version of the second business service 170 may use the same framework classes 164. Any number of versions of the second business service 170 may be loaded, each being loaded by its own classloader.

In various embodiments, in response to a version of a business services 170 creating an exception, the system (via bootstrap loader 120) may revert to the previous version of the business service 170. For example, in response to the second version of the first business service 170 creating an exception, the system (via bootstrap loader 120) may reload the first version of the first business service 170 using the first classloader (e.g., CustomBundle provider module 122, OSGIBundle provider module 124, etc.).

By utilizing the framework classes 164 and unique classloaders 122, 124 for each version of a business service 170, the process 301 disclosed herein allow for hot deployment, application standardization, easy integration, and code reuse.

With reference to FIG. 4, a process 401 for utilizing pluggable framework applications is disclosed. In response to the pluggable framework 110 being deployed in a computing environment and one or more pluggable framework applications being loaded via a classloader (e.g., CustomBundle provider module 122, OSGIBundle provider module 124, etc.), as discussed in the process 301, users, systems, applications, and the like may invoke pluggable framework 110 to access and interact with one or more data providers 180.

The process 401 may include receiving a data consumption request (step 402) via the REST service consumer 140 and/or the SOAP service consumer 150. The consumers 140, 150 may receive the data consumption request from an end user or an external system, application, or the like. The data consumption request may comprise the pluggable framework application needed to complete the request, a requested version of the pluggable framework application, the databases or the data providers 180 needed to complete the request (e.g., DP1 182, DP2 184, DP3 186, DP4 188, etc.), and/or the like.

In response to receiving the data consumption request, the process 401 may include invoking the pluggable framework 110, via the service provider 130 (step 404), to complete the request. For example, the service consumer 140, 150 may invoke the service provider 130 by transmitting the data consumption request. In response to being invoked, the service provider 130 may communicate with the bootstrap loader 120 to provide access to the classloader containing the pluggable framework application.

The process 401 may include verifying the current state of the pluggable framework application (step 406). The bootstrap loader 120 verifies the current state of the pluggable framework application with the instrumentation module 126. The instrumentation module 126 may check the current state of the pluggable framework application based on the version and pluggable framework application specified in the data consumption request. For example, each pluggable framework application, and/or version of each pluggable framework application, may be associated with an application ID, and the instrumentation module 126 verify the current state of the pluggable framework application by retrieving metadata corresponding to the application ID. In response to the state of the pluggable framework application being inactive, bootstrap loader 120 may throw an exception (e.g., via exception manager 114).

In response to the state of the pluggable framework application being active, the bootstrap loader 120 may determine the classloader (e.g., CustomBundle provider module 122, OSGIBundle provider module 124, etc.) containing the specified version of the pluggable framework application (step 408). The process 401 may include granting the service consumer 140, 150 access to the classloader containing the specified version of the pluggable framework application (step 410). In that regard, the service consumer (e.g., REST service consumer 140, SOAP service consumer 150, etc.) may interact with one or more data providers 180 using the instantiated pluggable framework application.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS' applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip and associated socket, or other removable storage units and interfaces, which allow software and data to be transferred from the removable storage unit to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Any database discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

What is claimed is:

1. A method comprising:
   loading, by a computer-based system, a configuration file, wherein the configuration file comprises initial setup instructions for a pluggable framework;
   deploying, by the computer-based system, the pluggable framework based on the configuration file;
   loading, by the computer-based system, a pluggable framework application into a classloader provided by the deployed pluggable framework, wherein the pluggable framework application comprises an IService interface that allows compatibility between the pluggable framework application and the pluggable framework;
   receiving, by the computer-based system, a data consumption request from a data consumer, wherein the data consumption request comprises a specified pluggable framework application;
   invoking, by the computer-based system, the pluggable framework based on the data consumption request; and
   granting, by the computer-based system, access to the classloader containing the pluggable framework application corresponding to the specified pluggable framework application, wherein in response to being granted access the data consumer interacts with the pluggable framework application for accessing a data provider.

2. The method of claim 1, wherein the configuration file comprises metadata of the pluggable framework application for loading during deployment of the pluggable framework.

3. The method of claim 2, wherein the configuration file defines a preloaded application for loading during deployment of the pluggable framework, and wherein the preloaded application comprises at least one of a security manager, an exception manager, or a framework class.

4. The method of claim 3, wherein the preloaded application is usable by the pluggable framework application.

5. The method of claim 1, wherein the loading the pluggable framework application comprises receiving the pluggable framework application from an admin user interface (UI) of the pluggable framework after deployment of the pluggable framework.

6. The method of claim 1, wherein the classloader comprises a Custom Bundle classloader or an OSGIBundle classloader.

7. A system, comprising:
   a processor; and
   a tangible, non-transitory memory configured to communicate with the processor, the tangible, non-transitory memory having instructions stored thereon that, in response to execution by the processor, cause the processor to perform operations comprising:
      loading, by the processor, a configuration file, wherein the configuration file comprises initial setup instructions for a pluggable framework;
      deploying, by the processor, the pluggable framework based on the configuration file; and
      loading, by the processor, a pluggable framework application into a classloader provided by the deployed pluggable framework, wherein the pluggable framework application comprises an IService interface that allows compatibility between the pluggable framework application and the pluggable framework;
      receiving, by the processor, a data consumption request from a data consumer, wherein the data consumption request comprises a specified pluggable framework application;

invoking, by the processor, the pluggable framework based on the data consumption request; and granting, by the processor, access to the classloader containing the pluggable framework application corresponding to the specified pluggable framework application, wherein in response to being granted access the data consumer interacts with the pluggable framework application for accessing a data provider.

8. The system of claim 7, wherein the configuration file comprises metadata of the pluggable framework application for loading during deployment of the pluggable framework.

9. The system of claim 8, wherein the configuration file defines a preloaded application for loading during deployment of the pluggable framework, and wherein the preloaded application comprises at least one of a security manager, an exception manager, or a framework class.

10. The system of claim 9, wherein the preloaded application is usable by the pluggable framework application.

11. The system of claim 7, wherein the loading the pluggable framework application comprises receiving the pluggable framework application from an admin user interface (UI) of the pluggable framework after deployment of the pluggable framework.

12. The system of claim 7, wherein the classloader comprises a CustomBundle classloader or an OSGIBundle classloader.

13. A non-transitory, computer-readable medium comprising machine-readable instructions that, when executed by a processor of a computing device, cause the computing device to at least:

load a configuration file, wherein the configuration file comprises initial setup instructions for a pluggable framework;

deploy the pluggable framework based on the configuration file; and load a pluggable framework application into a classloader provided by the deployed pluggable framework, wherein the pluggable framework application comprises an IService interface that allows compatibility between the pluggable framework application and the pluggable framework;

receive a data consumption request from a data consumer, wherein the data consumption request comprises a specified pluggable framework application;

invoke the pluggable framework based on the data consumption request; and grant access to the classloader containing the pluggable framework application corresponding to the specified pluggable framework application, wherein in response to being granted access the data consumer interacts with the pluggable framework application for accessing a data provider.

14. The non-transitory, computer-readable medium of claim 13, wherein the configuration file comprises metadata of the pluggable framework application for loading during deployment of the pluggable framework.

15. The non-transitory, computer-readable medium of claim 14, wherein the configuration file defines a preloaded application for loading during deployment of the pluggable framework, and wherein the preloaded application comprises at least one of a security manager, an exception manager, or a framework class.

16. The non-transitory, computer-readable medium of claim 15, wherein the preloaded application is usable by the pluggable framework application.

17. The non-transitory, computer-readable medium of claim 13, wherein the loading the pluggable framework application comprises receiving the pluggable framework application from an admin user interface (UI) of the pluggable framework after deployment of the pluggable framework.

18. The non-transitory, computer-readable medium of claim 13, wherein the classloader comprises a CustomBundle classloader or an OSGIBundle classloader.

* * * * *